United States Patent [19]

Tano et al.

[11] Patent Number: 5,039,849
[45] Date of Patent: Aug. 13, 1991

[54] CARD CONVEYING STRUCTURE FOR CARD ACCESSING DEVICES

[75] Inventors: Osamu Tano; Norio Kawashima, both of Kanagawa, Japan

[73] Assignee: NHK Spring Co., Ltd., Yokohama, Japan

[21] Appl. No.: 374,524

[22] Filed: Jun. 30, 1989

[30] Foreign Application Priority Data

Jul. 4, 1988 [JP] Japan .................. 63-166098
Jul. 4, 1988 [JP] Japan .................. 63-166099
Sep. 7, 1988 [JP] Japan .................. 63-224191
Oct. 18, 1988 [JP] Japan .................. 63-262379
Oct. 18, 1988 [JP] Japan .................. 63-262380

[51] Int. Cl.$^5$ .................. G06K 13/06; G06K 13/08
[52] U.S. Cl. .................. 235/475; 235/479; 235/481; 360/2
[58] Field of Search .............. 235/475, 479, 449, 481; 271/198, 199; 360/2

[56] References Cited

U.S. PATENT DOCUMENTS

| | | | |
|---|---|---|---|
| 2,789,819 | 4/1957 | Klotz .................. | 235/479 |
| 3,760,161 | 9/1973 | Lohne et al. .................. | 235/475 |
| 4,605,843 | 8/1986 | Aubrey .................. | 235/475 |
| 4,825,059 | 4/1989 | Kurihara et al. .................. | 235/475 |

Primary Examiner—Stuart S. Levy
Assistant Examiner—Richard M. Weinberg
Attorney, Agent, or Firm—Jeffers, Hoffman & Niewyk

[57] ABSTRACT

A card conveying structure for card accessing devices, comprising: a casing defining a card inlet and a card guideway; a drive pulley and a driven pulley supported on one side of the card guideway by a first pivot axis and a second pivot axis, respectively, defining a zero or small angle relative to a vertical line perpendicular to a major surface of a card guided by the guideway; and an endless belt passed around the two pulleys, effective diameters of the first and second pulleys being selected in relation with spacings of the pivot axes relative to the card guideway so that a linear span of the belt may extend along the guideway and abut the major surface of the card. By urging the linear span of the belt against the card, the card may be conveyed by the movement of the belt. Alternatively, by slanting at least one of the pulleys towards the guideway until its periphery or the belt passed around it comes into contact with the card, the movement of the belt or the pulley can be transmitted to the card. In either case, elimination of the need for pulleys having piovt axes perpendicular to the card conveying direction and in parallel with the card conveying plane leads to a substantial reduction in the vertical dimension of the card accessing device.

19 Claims, 10 Drawing Sheets

CARD CONVEYING STRUCTURE FOR CARD ACCESSING DEVICES

TECHNICAL FIELD

The present invention relates to a card conveying structure for conveying a card from a card inlet of a card accessing device for reading and writing information by electronic, magnetic, optical and other means, to an information accessing position located inside the card accessing device and returning the card to the card inlet to allow it to be retrieved by the user.

BACKGROUND OF THE INVENTION

Conventionally, various devices for conveying cards have been known in the forms of card reader/writers for reading and writing various forms of information from and into media such as IC storage cards incorporating IC storage devices and other media which can store information by optical, magnetic, electronic and other means.

According to a known device, a card inserted into a casing is interposed between a drive roller and a driven roller opposing each other, and is conveyed thereby. An upper frame of a casing carries a pair of drive rollers, and a lower frame of the casing carries a pair of driven rollers so as to define a pair of nips along a card guideway. One of the drive rollers is coupled coaxially with a drive pulley which is belt driven by a motor. Further, the two drive rollers are coupled with each other by way of coaxially arranged transmission pulleys around which a belt is passed.

According to such a structure, since the pulleys are rotatably supported around axial lines extending in parallel with the card conveying plane, the outer diameters of the pulleys are required to be reduced in order to reduce the vertical dimension of the device. However, when pulleys having smaller diameters than appropriate for the belt are used, the durability of the belt is substantially impaired. On the other hand, if pulleys having sufficiently large diameters are used, it becomes difficult to reduce the vertical dimension of the device. Furthermore, when access to the magnetic strip in the card is to be made while the card is being conveyed, it is desired to achieve a constant conveying speed, and pulleys having smaller diameters are not desirable because they produce a small flywheel effect, i.e. a small moment of inertia of the related rotating member.

BRIEF SUMMARY OF THE INVENTION

In view of such problems of the prior art, a primary object of the present invention is to provide a card conveying device having a reduced vertical dimension.

A second object of the present invention is to provide a card conveying device which is easy to manufacture and assemble.

A third object of the present invention is to provide a card conveying device having a high level of reliability.

These and other objects of the present invention can be accomplished by providing a card conveying structure for card accessing devices, comprising: a casing defining a card inlet and a card guideway extending from the card inlet into an internal part of the casing; a first pulley supported on one side of the card guideway adjacent to the card inlet by a first pivot axis defining a zero or small angle relative to a vertical line perpendicular to a major surface of a card guided by the guideway; a second pulley supported on one side of the card guideway more remote from the card inlet than the first pulley by a second pivot axis defining a zero or small angle relative to the vertical line; an endless belt passed around the two pulleys, effective diameters of the first and second pulleys being selected in relation with spacings of the pivot axes relative to the card guideway so that a linear span of the belt may extend along the guideway and abut the major surface of the card; drive means for producing mechanical power; and power transmission means for transmitting the mechanical power to at least one of the pulleys as rotary power for rotating the same.

Since the pulleys are supported so as to be rotatable around axial lines perpendicular to the card conveying plane, the vertical dimension of the device can be reduced as it is not dictated by the diameters of the pulleys.

According to a preferred embodiment of the present invention, a positive contact between the endless belt and the card is accomplished by inclining at least one of the first and second pivot axes toward the guideway relative to the vertical line so that a part of the belt passed around a peripheral part of the corresponding pulley is in contact with the major surface of the card. To increase the span length of contact between the belt and the card, a peripheral part of the corresponding pulley may be provided with frictional engagement means abutting the major surface of the card. Thereby, the longitudinal length of the device can be reduced.

As an additional or alternate approach to establishing a favorable contact between the belt and the card, it is recommended to use means for urging at least part of the linear span of the belt against the major surface of the card. This urging means may comprise a roller rotatably supported around a pivot axis extending perpendicular to a card conveying direction and in parallel with the major surface of the card.

Since the part of the belt which has just been paid out from one of the pulleys, especially, the drive pulley tends to deviate outwards from its prescribed loop due to the resistance which the linear span experiences by contact with the card or other parts of the device, it is preferred to use means for restricting movement of the endless belt in a plane defined by one of the pulleys directed outwards relative to its loop at an end of the linear span adjacent to the pulley. This restricting means may consist of a vertically oriented roller or a circumferential groove provided in a roller for urging the belt toward the card.

To minimize the vertical dimension of the device, the drive source should consist of a flat motor. If the pulleys are supported by vertical pivot shafts, spur gears may be used for transmitting torque from the motor to the drive pulley. If the pivot shaft of the drive pulley is slanted with respect to the output shaft of the motor, conical gears may be used, but, more preferably in terms of ease of assembly work, a combination of a helical gear and a spur gear may also be used.

The card should be elastically supported against the urging force from the belt. To avoid local bending of the card in a plane perpendicular to the longitudinal direction of the belt and achieve a sufficient level of flexibility in such a support, it is recommended to use support means comprising a sheet spring fixedly secured to a lower wall of the casing at its base end and having bifurcated free ends extending along the guideway, a guide roller pivotally supported between the bifurcated free ends of the sheet spring so as to be rotatable around a pivot axis perpendicular to the guideway and in parallel with the major surface, and a bridge member extending across the bifurcated free ends at their parts adjacent to the guide roller.

Instead of using a pair of pulleys and an endless belt to convey a card, it is possible to use a drive roller supported on one side of the card guideway adjacent to the card inlet by a pivot axis inclined towards the guideway by a small angle relative to a vertical line perpendicular to a major surface of a card guided by the guideway, a peripheral part of the drive roller being provided with frictional engagement means and an effective diameter of the drive roller and the small angle being selected in relation with a spacing of the pivot axis relative to the card guideway so that the frictional engagement means may abut the major surface of the card.

BRIEF DESCRIPTION OF THE DRAWINGS

Now the present invention is described in the following with reference to the appended drawings, in which.

DESCRIPTION OF THE PREFERRED EMBODIMENTS

Figure 1:
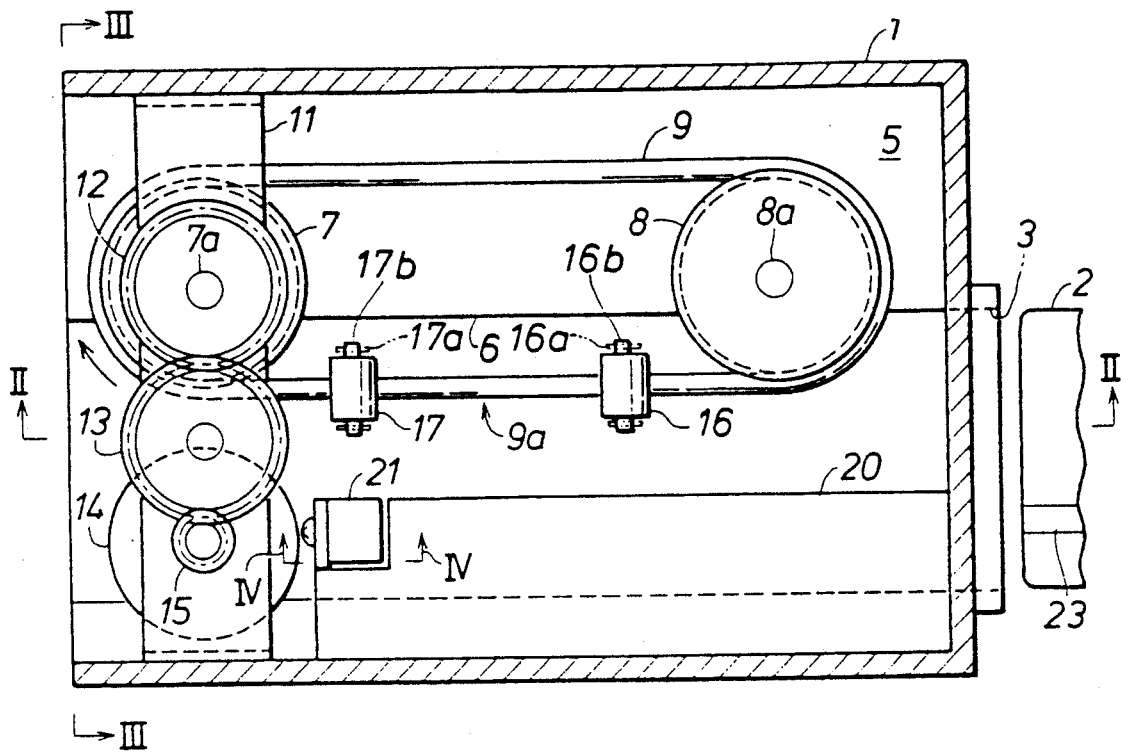
FIG. 1 is a plan view of a first embodiment of the card conveying structure according to the present invention with an upper part of its casing removed.
Figure 2:
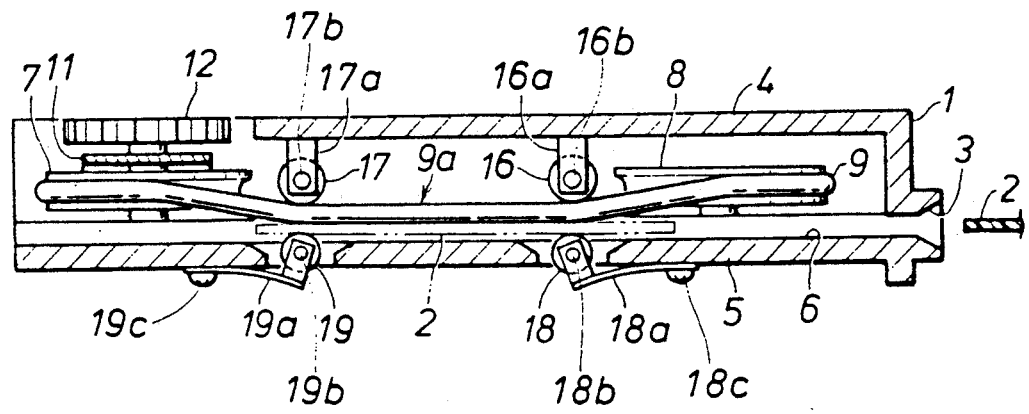
FIG. 2 is a sectional side view taken along line II—II of FIG. 1.
Figure 3:
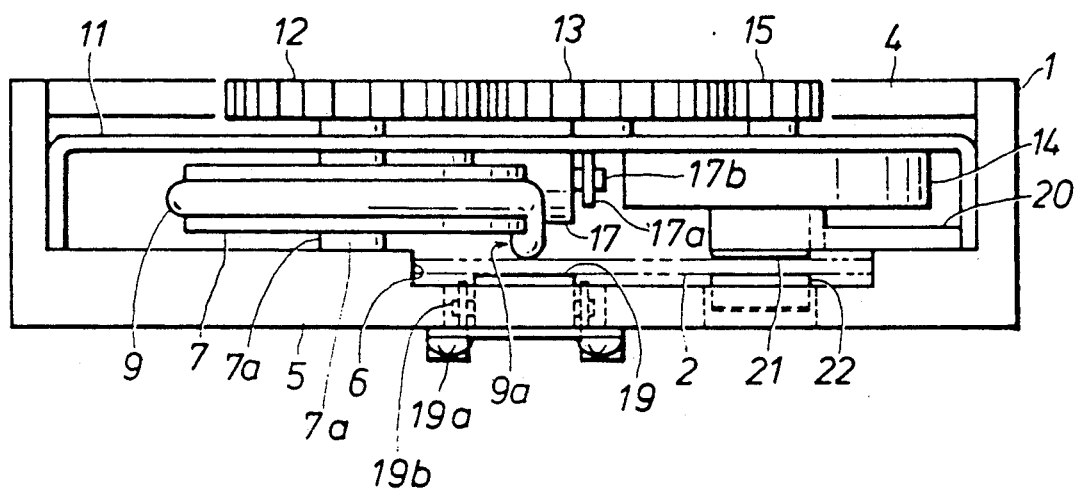
FIG. 3 is a rear end view as seen from line III—III of FIG. 1.

FIGS. 1 through 4 illustrate a first embodiment of the present invention. The casing 1 consists of a box which is planar and elongated along its longitudinal direction as shown in FIGS. 1 and 2 and is provided with an open rear end at one of its longitudinal ends. The front end of the casing 1 located on the right hand side of the drawings is provided with a card inlet 3 for inserting a magnetic card 2 therefrom. The card 2, inserted into this card inlet 3, passes through a gap defined between an upper plate 4 and a lower plate 5 of the casing 1. The lower plate 5 is provided with a guide recess 6 for receiving a card 2 therein and guiding the lateral edges of the card along the direction in which the card is conveyed.

A drive pulley 7 and a driven pulley 8 are arranged on one side of the guide recess 6 in mutually spaced relationship along the card conveying direction. These pulleys 7 and 8 have a same diameter, and are pivotally supported by shafts 7a and 8a projecting from the lower plate 5 so as to be rotatable around pivot axes which are perpendicular to the card conveying plane. A belt 9, which, for instance, may be made of rubber and provided with a circular cross section, is passed around the pulleys 7 and 8, and one of its linear spans 9a extends along the guide recess 6 along the card conveying direction.

A mounting bracket 11 extends across the side walls in a part of the casing 1 adjacent to the drive pulley 7 and is passed above the drive pulley 7. The upper end of the rotary shaft 7a of the drive pulley 7 projecting above the mounting bracket 11 carries a large-diameter gear 12 securely attached thereto. The large-diameter gear 12 meshes with an idler gear 13 which is rotatably supported by the mounting bracket 11, and the idler gear 13 meshes with a small-diameter drive gear 15 of a flat motor 14 fixedly secured to the lower surface of the mounting bracket 11.

A pair of guide rollers 16 and 17 are pivotally supported by brackets 16a and 17a depending from the upper plate 4 adjacent either end of the linear span 9a of the belt 9, via pivot pins 16b and 17b extending in parallel with the major surface of the card 2 and perpendicular to the linear span 9a of the belt 9. As best shown in FIG. 2, the guide rollers 16 and 17 guide the linear span 9a of the belt 9 in such a manner that the linear span 9a protrudes into the guide recess 6 which contains the card conveying plane. Idler rollers 18 and 19 are provided opposite to the guide rollers 16 and 17 so as to oppose the guide rollers 16 and 17 via openings provided in the lower plate 5. Each of the idler rollers 18 and 19 is rotatably carried, via a pivot pin 18b or 19b, by the free end of a sheet spring 18a or 19a which is fixedly secured to the lower surface of the lower plate 5 by screws 18c and 19c at its base end, so that the idler rollers 18 and 19 elastically bear upon the parts of the linear span 9a of the belt 9 guided by the guide rollers 16 and 17, respectively, to interpose the card 2 therebetween.

Figure 4:
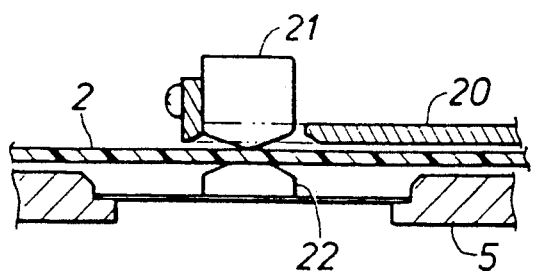
FIG. 4 is a fragmentary sectional view taken along line IV—IV of FIG. 1.

A guide plate 20 extending from the card inlet 3 to an area adjoining the bracket 11 is fixedly secured in the casing 1 so as to cover a side part of the guide recess 6 remote from the belt 9 along the card conveying direction. Thus, the card 2 inserted from the card inlet 3 is received, along one of its side edges, between the guide plate 20 and the bottom surface of the guide recess 6 so as to be constrained therebetween. A magnetic head 21 for writing and reading information into and from a magnetic tape portion 23 of the card 2 is fixedly secured to the end portion of the guide plate 20 adjacent to the bracket 11 so as to face the guide recess 6 as shown in FIG. 4, and the part of the bottom surface of the guide recess 6 opposing the magnetic head 21 is provided with a pressure pad 22 elastically biased towards the magnetic head 21.

According to the card conveying device of the above described structure, when a card 2 is inserted from the card inlet 3, a sensor not shown in the drawing responds thereto and activates the flat motor 14 into driving the drive pulley 7 in the direction indicated by the arrow in FIG. 1. Since the front end of the card 2 is elastically gripped between the linear span 9a of the belt 9 and the idler roller 18 adjacent to the card inlet 3, the card 2 is conveyed towards the rear end of the casing 1. Subsequently, as shown by the imaginary lines in FIG. 2, the card 2 is gripped also between the linear span 9a of the belt 9 and the idler roller 19 on the left hand side of the drawing, and is further conveyed. Thus, as shown in FIG. 4, the magnetic head 21 reads and writes information from and into the magnetic tape portion 23 of the card 2 which is urged by the pressure pad 22 towards the magnetic head 21. After the reading or writing of information is completed, the card 2 may be returned to the card inlet 3 by reversing the flat motor 14 to allow the card to be retrieved.

By thus supporting the drive pulley 7 and the driven pulley 8 so as to be rotatable around axial lines perpendicular to the card conveying plane, the vertical dimension of the card conveying device may be favorably reduced without being dictated by the diameters of the pulleys. Furthermore, since pulleys having relatively large diameters can be used, a sufficient flywheel effect is produced, and the conveying speed of the card 2 can be easily stabilized. In particular, by using a flat motor 14 instead of an ordinary cylindrical motor, the vertical dimension of the casing 1 may be substantially reduced. The belt 9 had a round cross section in the above described embodiment, but other cross sections such as rectangular cross sections can also be used.

Figure 5:
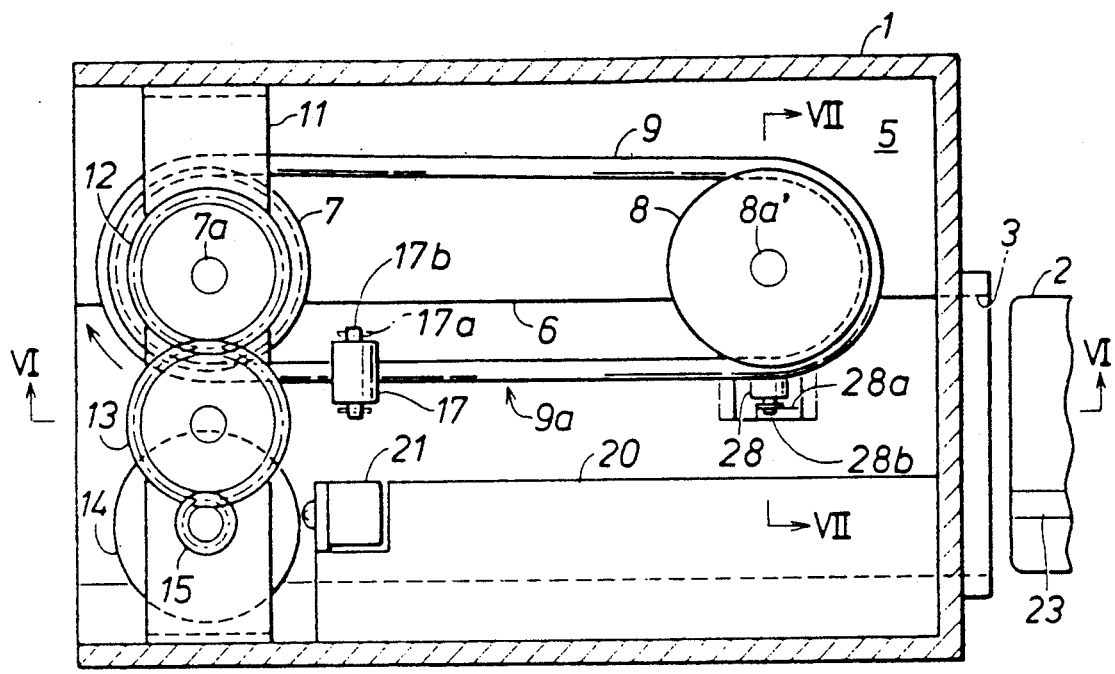
FIG. 5 is a plan view of a second embodiment of the card conveying structure according to the present invention with an upper part of its casing removed.
Figure 6:
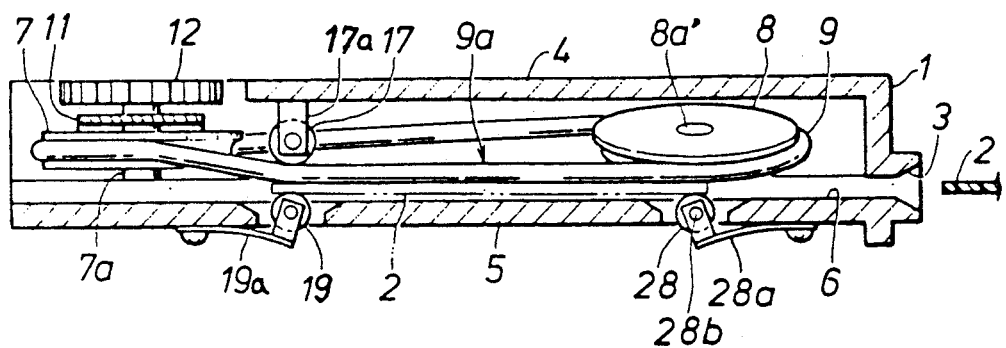
FIG. 6 is a sectional side view taken along line VI—VI of FIG. 5.
Figure 7:
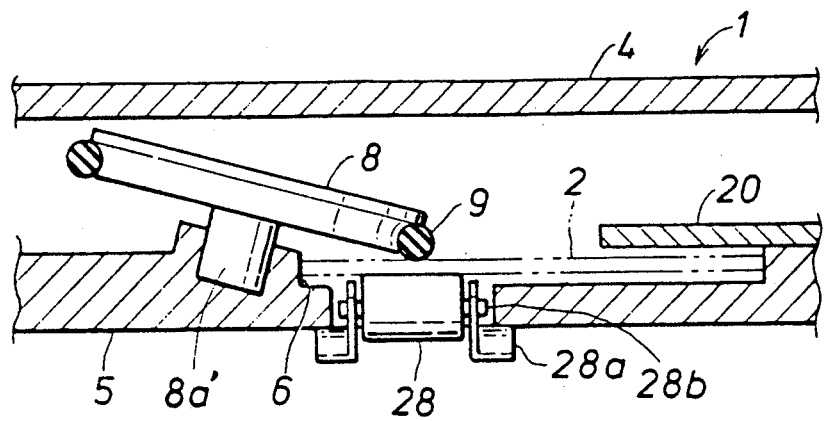
FIG. 7 is a fragmentary sectional view taken along line line VII—VII of FIG. 5.

FIGS. 5 through 7 illustrate a second embodiment of the present invention, and the parts similar to those of the previous embodiments are denoted with like numerals. According to this embodiment, the guide roller 16 on the card inlet side is eliminated, and the pivot shaft 8a' of the driven pulley 8 is inclined toward the guide recess 6 by a small angle. As best shown in FIG. 7, a part of the belt 9 passed around the driven pulley 8 can abut the card 2 received in the guide recess 6 against an idler roller 28, similar to the idler roller 18 of the previous embodiment, which is supported by an elastic support consisting of a sheet spring 28a and a pivot pin 28b. According to this embodiment, since not only the linear span 9a of the belt 9 but also the part of the belt 9 wrapped around the pulley 8 can be effectively used for conveying the card 2, the longitudinal length of the device can be reduced for given longitudinal card travel requirements.

Figure 8:
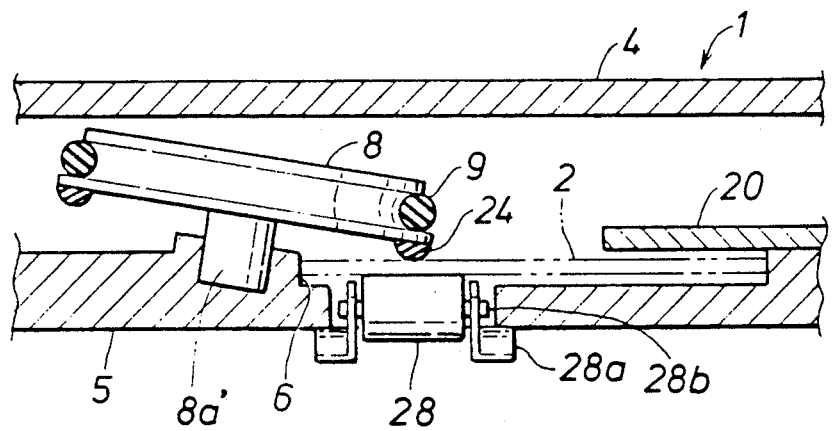
FIG. 8 is a view similar to FIG. 7 showing a modified embodiment of the present invention.

FIG. 8 shows a modified embodiment in which an annular member 24 made of rubber material is fixedly attached to a peripheral part of a lower surface of the driven pulley 8, having an inclined pivot shaft 8a', in coaxial relationship. In this case, the annular member 24 is capable of conveying the card 2, and an effect similar to that of the embodiment illustrated in FIG. 7 may be produced.

Figure 9:
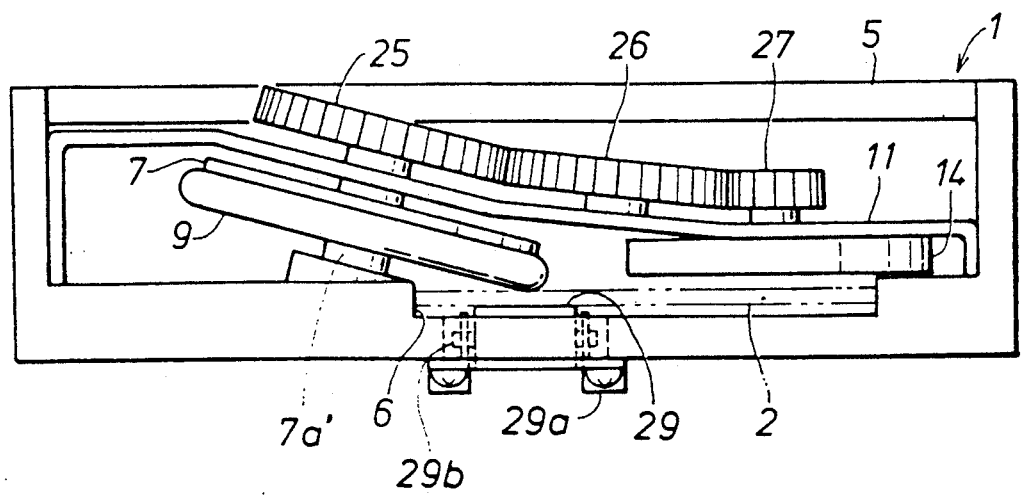
FIG. 9 is a view similar to FIG. 3 showing another modified embodiment of the present invention.

According to the modified embodiment illustrated in FIG. 9, not only the driven pulley 8 but also the drive pulley 7 has a pivot shaft 7a' which is slightly inclined towards the guide recess 6. Therefore, the part of the belt 9 wrapped around the pulley 7 abuts the card 2 against an idler roller 29, similar to the idler roller 28 of the previous embodiment, which is supported by an elastic support consisting of a sheet spring 29a and a pivot pin 29b. In this case also, since not only the linear span 9a of the belt 9 but also the part of the belt 9 wrapped around the pulley 7 can be effectively used for conveying the card 2, the longitudinal length of the device can be reduced even further for given longitudinal card travel requirements.

The motor 14 may also be inclined so that the power output from the motor 14 may be transmitted to the drive pulley 7 strictly by spur gears or by a belt, but to minimize the vertical dimension of the device, it is preferred to mount the motor 14 with its output shaft directed vertically, and transmit its output by conical gears 25, 26 and 27 having appropriate cone angles. In the illustrated embodiment, the mounting bracket 11 has three regions having successively larger angles of inclination, and the motor 14 having the drive gear 27, a pivot shaft carrying the idler gear 26, and the drive pulley 7 carrying the driven gear 25 are mounted on these three different regions. Alternatively, combination of a helical gear and a spur gear may be used in a similar way as in the embodiment illustrated in FIGS. 16 through 19 and described hereinafter.

If desired, it is possible to use a slanted pivot shaft 7a' for the drive pulley 7 and use a vertical pivot shaft 8a for the driven pulley 8 and obtain a similar advantage of the present invention.

Figure 10:
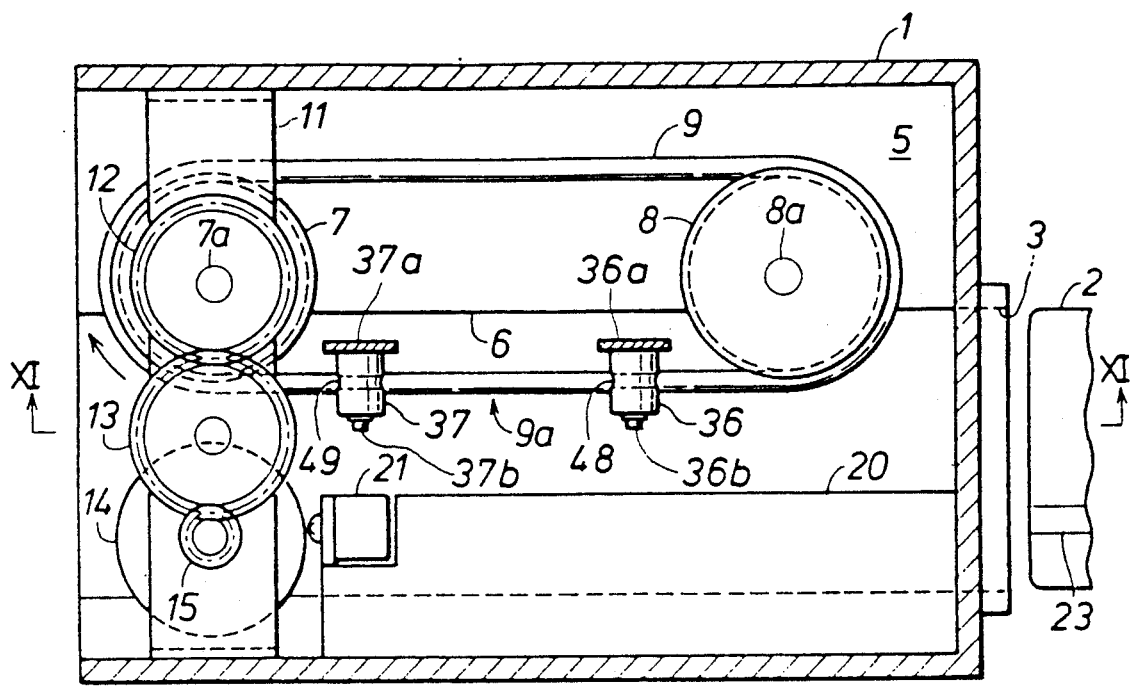
FIG. 10 is a plan view of a third embodiment of the card conveying structure according to the present invention with an upper part of its casing removed.
Figure 11:
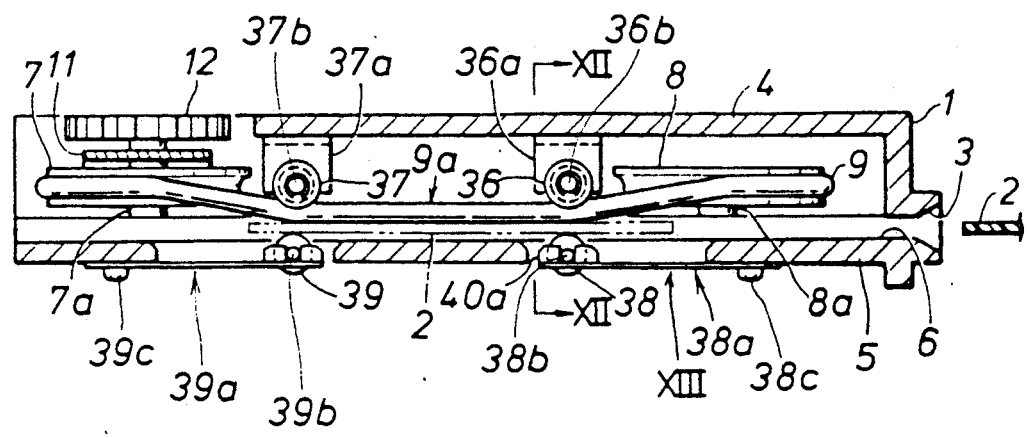
FIG. 11 is a sectional side view taken along line XI—XI of FIG. 10.
Figure 12:
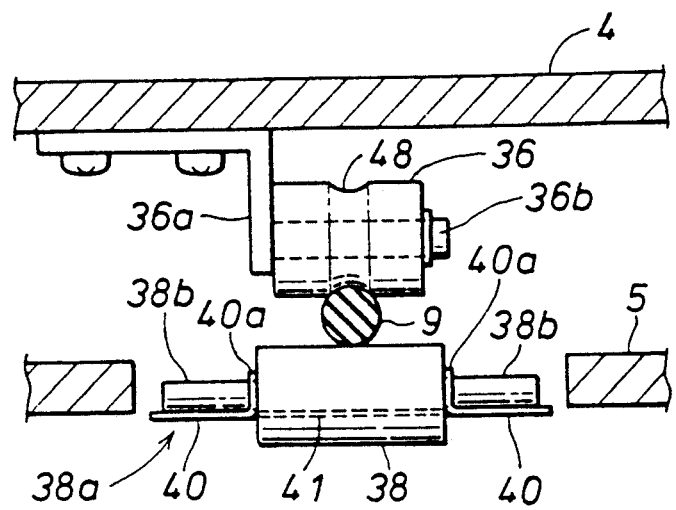
FIG. 12 is a fragmentary sectional view taken along line XII—XII of FIG. 11.

According to the embodiments illustrated in FIGS. 10 through 12, the pivot shafts 7a and 8a of the drive pulley 7 and the driven pulley 8 are both perpendicular to the major surface of the card 2, and a linear span 9a of the belt 9 therebetween is made to protrude into the guide recess 6 by a pair of guide rollers 36 and 37 which are pivotally supported by brackets 36a and 37a mounted on the lower surface of the upper plate 4 and pivot pins 36b and 37b. So far, this embodiment is similar to the first embodiment illustrated in FIGS. 1 through 4. But, according to this embodiment, the guide rollers 36 and 37 are provided with circumferential grooves 48 and 49, respectively, which are adapted to at least partially receive the belt 9 therein.

According to this embodiment, since the grooves 48 and 49 restrict the lateral movement of the belt 9 from its normal looping trajectory, the movement of the belt 9 can be stabilized. In particular, the tendency of the part of the belt 9 immediately after being paid out from one of the pulleys, especially the drive pulley, to move outward due to the resistance applied to the linear span 9a of the belt 9 can be eliminated.

Figure 13:
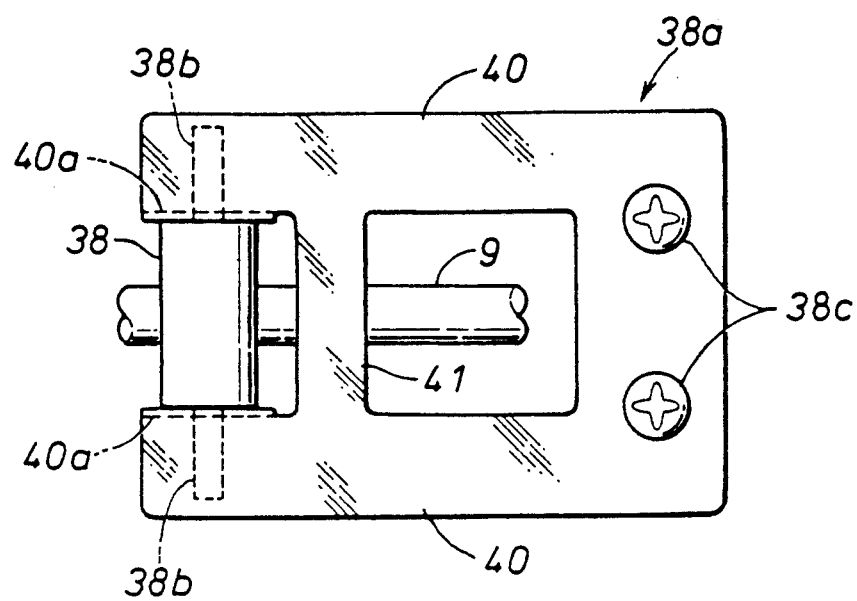
FIG. 13 is a fragmentary enlarged bottom view of an embodiment of the support means as seen from line XIII of FIG. 11.

FIG. 13 shows the structure for supporting the idler roller 38 which supports the card 2 against the pressure from the belt 9. The idler roller 38 is provided with a pivot pin 38b extending from either end thereof. The sheet spring 38a is securely attached to the lower surface of the lower plate 5 by screws 38c at its base end, and comprises a pair of arm pieces 40 extending along the card conveying direction, and a pair of vertical pieces 40a provided in free end portions of the arm pieces 40 for receiving the pivot pin 38b with their slots.

The sheet spring 38a is further provided with a bridge piece 41 which connects parts of the arm pieces 40 adjacent to the vertical pieces 40a with each other.

Since the sheet spring 38a is thus provided with bifurcated free ends in the forms of the arm pieces 40, it is given with a desired flexibility. The bridge piece 41 is used to overcome the tendency of these arm pieces 40 to deflect individually so as to cause undesirable slanting to the roller 38 when the belt 9 abuts the roller 38 at a point other than its exact longitudinal center.

Figure 14:
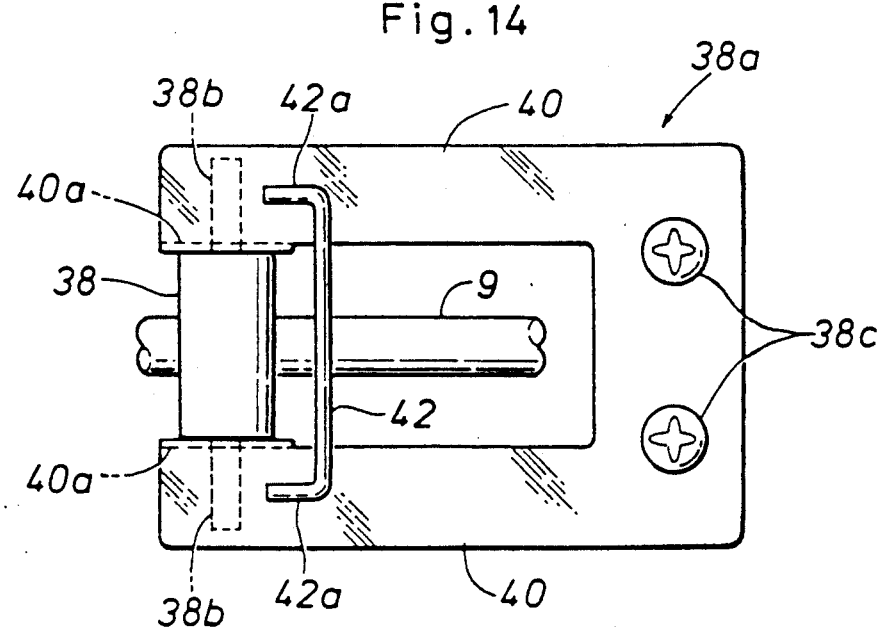
FIG. 14 is a view similar to FIG. 13 showing a modified embodiment of the support means.

FIG. 14 shows an alternate embodiment of the sheet spring 38a for supporting the roller 38. In this case, the bridge piece 42 is made of a rod member, and comprises a main part extending across the two free ends of the arm pieces 40, and bent end portions 42a which are securely attached to the corresponding free ends of the arm pieces 40 by brazing.

Figure 15:
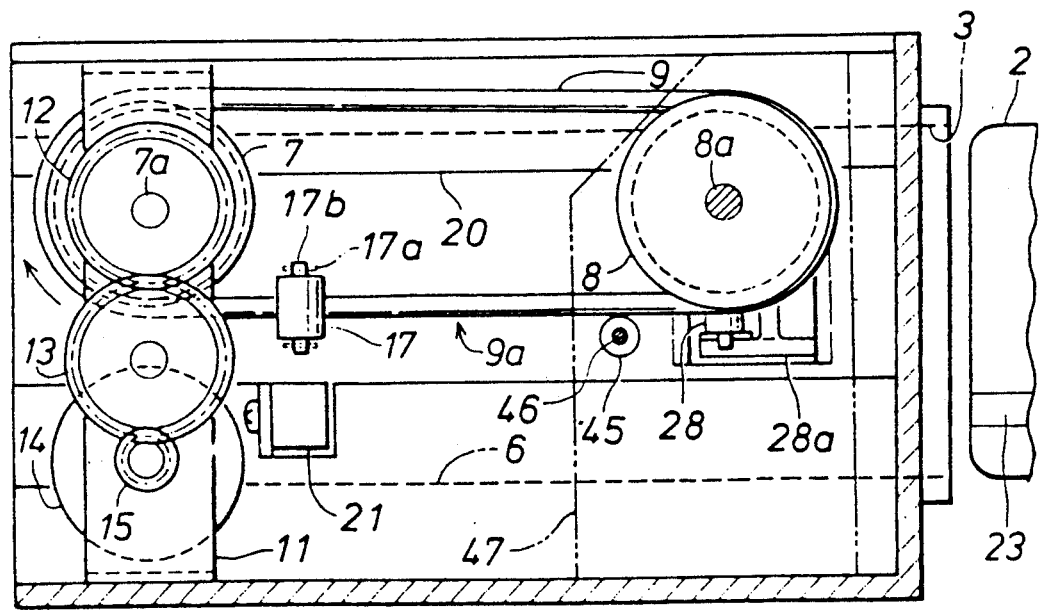
FIG. 15 is a plan view of a fourth embodiment of the card conveying structure according to the present invention with an upper part of its casing removed.

An effect similar to that of the embodiment illustrated in FIGS. 10 through 12 can be achieved by the embodiment illustrated in FIG. 15 by using a guide roller 45 which is pivotally supported by a vertical pivot pin which may be fixedly secured to a bracket 47 on which the driven pulley 8 is supported. This embodiment utilizes a vertical pivot shaft 7a for the drive pulley 7 and an inclined pivot shaft 8a for the driven pulley 8.

Figure 16:
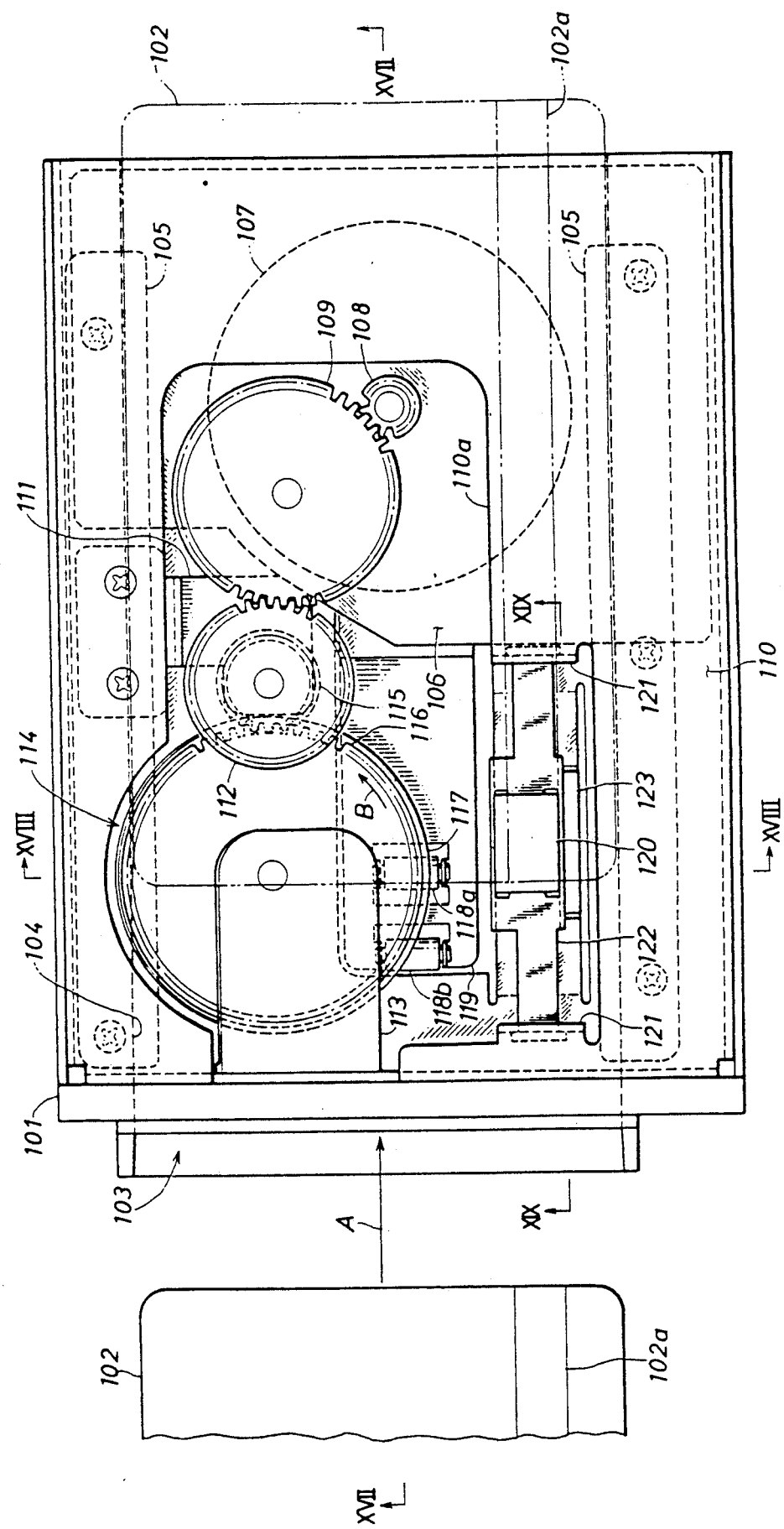
FIG. 16 is a plan view of a fifth embodiment of the card conveying structure according to the present invention with an upper part of its casing removed.
Figure 17:
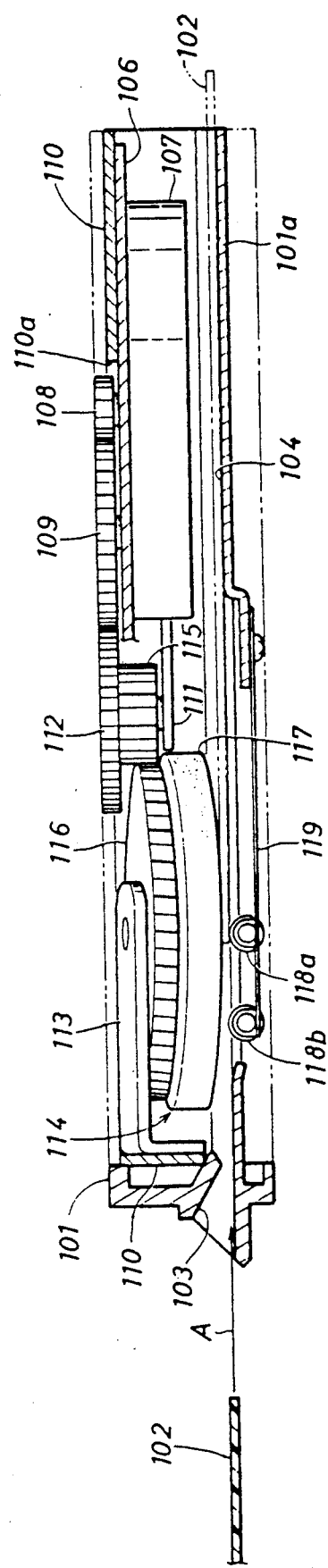
FIG. 17 is a sectional side view taken along line XVII—XVII of FIG. 16.
Figure 18:
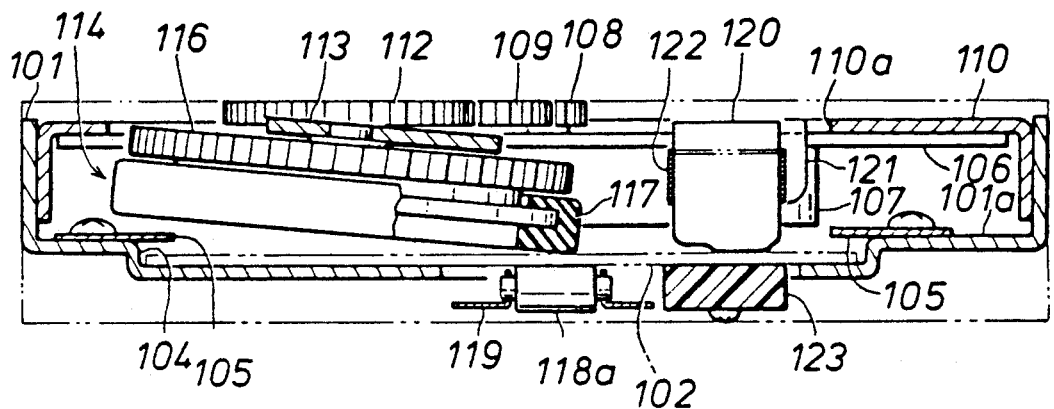
FIG. 18 is a sectional front view taken along line XVIII—XVIII of FIG. 16.

FIGS. 16 through 19 illustrate a fifth embodiment of the present invention. The casing 101 consists of a box which is planar and elongated along the lateral longitudinal direction as shown in FIGS. 16 and 17 and is provided with an open rear end at one of its longitudinal ends. The front end of the casing 101 located on the right hand side of the drawings is provided with a card inlet 103 for inserting a magnetic card 102 therefrom. As shown in FIGS. 16 through 19, a bottom wall 101a of the casing 101 is provided with a guide recess 104. A pair of guide plates 105 are fixedly secured to the bottom wall 101a by means of screws along either side of the guide recess 104 partially extending over the guide recess 104.

The casing 101 comprises a planar frame 110 which is fixedly supported along its edges extending along its card inlet end and either side end so as to cover an upper end of the casing 101, and a planar bracket 106 is fixedly secured to the lower surface of a rear part of the frame 110 so as to extend laterally of the casing 101 and oppose the bottom wall 101a. A flat motor 107 is fixedly secured to the lower surface of the bracket 106. A drive gear 108 consisting of a spur gear fixedly attached to the drive shaft of the motor 107 protrudes from the upper surface of the bracket 106 which is partly exposed from a cut-out portion 110a of the frame 110, and an idler gear 109 having a relatively large diameter and pivotally supported by the bracket 106 meshes with the drive gear 108. The drive gear 108 and the idler gear 109 are rotatably supported by axial lines which are perpendicular to the card conveying plane.

With the idler gear 109 meshes another idler gear 112 which is disposed closer to the card inlet 103 end and is provided with a relatively small diameter. This idler gear 112 is supported, so as to be rotatable around a pivot axis which is in parallel with that of the idler gear 109, by a bracket 111 which is attached to the frame 110 by screws so as to be adjusted relative to the frame 110. A small-diameter gear 115 is coaxially and integrally attached to the lower surface of the idler gear 112 so as to protrudes below the frame 110.

An L-shaped bracket 113 having a base end fixedly secured to the card inlet end of the frame 110 opposes the card conveying plane and is disposed slightly slanted with respect to the card conveying direction in a part of the casing adjoining the card inlet 103. To a lower part of a free end of the bracket 113 is pivotally attached a helical gear portion 116 and a disk shaped conveying roller 114 integrally and coaxially joined together thereto, in that order, so that they may be integrally rotatable around a pivot axis which is perpendicular to the card conveying direction and slanted with respect to the card conveying plane. This gear portion 116 consisting of a helical gear meshes with the small-diameter gear 115 and is provided with teeth which are given with a certain twisting angle equal in magnitude to the slanting angle of the conveying roller 114 relative to the card conveying plane so as to be in parallel with the teeth of the small-diameter gear 115 in the region where the two gears mesh with each other.

In this way, the rotation of the drive gear 108 of the motor 107 is reduced in speed by the idler gears 109 and 112 and the small-diameter gear 115, and is finally transmitted to the gear portion 116 and the conveying roller 114.

To the periphery of the conveying roller 114 is attached an annular roller portion 117 which has a C-shaped cross section with its open end directed radially inwards and is made of, for instance, rubber material. In a part adjoining the bottom wall of the guide recess 104, a pair of idler rollers 118a and 118b serving as counter pressure means are arranged so as to oppose the part of the roller portion 117 closest to the card conveying plane and to rise to the level of the bottom surface of the guide recess 104. These idler rollers 118a and 118b are rotatably supported by the free end of a sheet spring 119 having a base end fixedly secured to the L-shaped bracket portion provided in the bottom wall of the guide recess 104 as best shown in FIG. 17, and are urged upwards with respect to the card conveying plane. One of the idler rollers 118a is provided opposite to the part of the conveying roller 114 closest to the card conveying plane while the other idler roller 118b is provided adjacent to the card inlet end at an appropriate distance from the first mentioned idler roller 118a.

Figure 19:
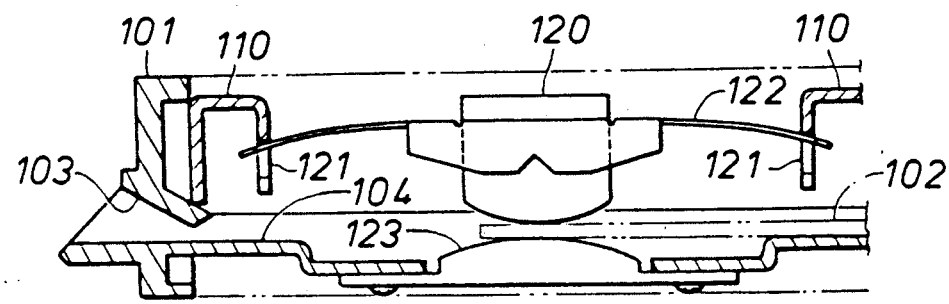
FIG. 19 is a fragmentary sectional view taken along line XIX—XIX of FIG. 16.

A magnetic head 120 for accessing a magnetic stripe 102a of the card 102 is provided on one side of the part of the conveying roller 114 closest to the card conveying plane. The magnetic head 120 is supported by a middle part of a pressure spring 122 consisting of a sheet spring which is supported at its either end by a pair of engagement portions 121 which are provided on either end of the cut-out portion 110a of the frame 110 along the card conveying direction, and is urged downward towards the card conveying plane as shown in FIG. 19. A pad member 123 having a convex surface directed toward the magnetic head 120 opposes the magnetic head 120 from below through an opening provided in the bottom wall of the guide recess 104.

According to the card conveying device of the above described structure, when a card 102 is inserted from the card inlet 103 in the direction indicated by the arrow in FIG. 16, a sensor not shown in the drawing responds thereto and activates the flat motor 107 into driving the conveying roller 114 in the direction indicated by the arrow B in FIG. 16 by way of the idler gears 109 and 112. Since the front end of the card 102 is elastically gripped by the hips defined between the roller portion 17 of the conveying roller 114 and the two idler rollers 118a and 118b, the card 102 is conveyed towards the rear end of the casing 101. In this conjunction, since the card 102 is conveyed while it is held between the magnetic head 120 elastically urged towards the pad member 123 and the pad member 123, a reliable reading and writing of information from and into the magnetic stripe 102a of the card 102 by the magnetic head 120 is made possible. After the reading or writing of information is completed, the motor 107 is reversed so as to return the card 102 to the card inlet 103 and allow it to be retrieved.

According to the present invention, it is also possible to use a spur gear for the gear portion 116 of the conveying roller 114 and a helical gear for the small-diameter gear 115, and the position of the helical gear is not limited by the disclosed embodiment. The present invention pertained to a magnetic card conveying device, but it can be also applied to conveying devices for conveying other cards such as IC cards.

Thus, according to the present embodiment, since the card is conveyed by conveying means consisting of a member which either consists of a disk member rotatably supported around an axial line inclined with respect to a card conveying plane or is synchronized with such a disk member and produces a drive force for conveying the card, a disk member having a large diameter can be used without increasing the vertical dimension of the device while ensuring a high flywheel effect. By using a helical gear in a part of the power transmission means, the remaining part of the power transmission means may consist of spur gears, and the manufacturing and the assembling of the device are both simplified.

What we claim is:

1. A card conveying structure for card accessing devices, comprising:
    a casing defining a card inlet and a card guideway extending from said card inlet into an internal part of said casing;
    a first pulley supported on one side of said card guideway adjacent to said card inlet by a first pivot axis defining a zero or small angle relative to a vertical line perpendicular to a major surface of a card guided by said guideway;
    a second pulley supported on one side of said card guideway more remote from said card inlet than said first pulley by a second pivot axis defining a zero or small angle relative to said vertical line;
    an endless belt passed around said two pulleys, effective diameters of said first and second pulleys being selected in relation with spacings of said pivot axes relative to said card guideway so that a linear span of said belt may extend along said guideway and abut said major surface of said card;
    drive means for producing mechanical power; and
    power transmission means for transmitting said mechanical power to at least one of said pulleys as rotary power for rotating the same.

2. A card conveying structure according to claim 1, wherein one of said first and second pivot axes is inclined toward said guideway relative to said vertical line so that a part of said belt passed around a peripheral part of the corresponding pulley is in contact with said major surface of said card.

3. A card conveying structure according to claim 2, wherein a peripheral part of said corresponding pulley is provided with frictional engagement means abutting said major surface of said card.

4. A card conveying structure according to claim 2, wherein the other of said first and second pivot axes is also inclined toward said guideway relative to said vertical line so that a part of said belt passed around a peripheral part of the corresponding pulley is in contact with said major surface of said card.

5. A card conveying structure according to claims 3 or 4, wherein a peripheral part of said corresponding pulley is provided with frictional engagement means abutting said major surface of said card.

6. A card conveying structure according to claim 1, further comprising means for restricting movement of said endless belt in a plane defined by one of said pulleys directed outwards relative to its loop at an end of said linear span adjacent to said pulley.

7. A card conveying structure according to claim 1, further comprising means for urging at least part of said linear span of said belt against said major surface of said card.

8. A card conveying structure according to claim 7, wherein said urging means comprises a roller rotatably supported around a pivot axis extending perpendicular to a card conveying direction and in parallel with said major surface of said card.

9. A card conveying structure according to claim 7, wherein said urging means comprises a roller abutting said belt against said major surface of said card and having a pivot axis substantially in parallel with said major surface and perpendicular to the longitudinal direction of said linear span of said belt.

10. A card conveying structure according to claim 9, wherein said roller is provided with a circumferential groove for at least partially receiving said belt therein.

11. A card conveying structure according to claim 1, wherein said drive source comprises a flat motor.

12. A card conveying structure according to claim 11, wherein said support means comprises a sheet spring fixedly secured to a lower wall of said casing at its base end and having bifurcated free ends extending along said guideway, a guide roller pivotally supported between said bifurcated free ends of said sheet spring so as to be rotatable around a pivot axis perpendicular to said guideway and in parallel with said major surface, and a bridge member extending across said bifurcated free ends at their parts adjacent to said guide roller.

13. A card conveying structure according to claim 1, wherein said pivot axes both define substantially zero angles relative to said vertical line, and said power transmission means consist of spur gears disposed in parallel with said major surface.

14. A card conveying structure according to claim 1, wherein said pivot axis of one of said pulleys which is driven by said power source defines a certain small angle relative to said vertical line, and said power transmission means comprises a helical gear meshing with a spur gear.

15. A card conveying structure according to claim 1, wherein said pivot axis of one of said pulleys which is driven by said power source defines a certain small angle relative to said vertical line, and said power transmission means comprises conical gears.

16. A card conveying structure according to claim 1, further comprising support means elastically supporting another major surface of said card against a part of said linear span abutting said card.

17. A card conveying structure for card accessing devices, comprising:
    a casing defining a card inlet and a card guideway extending from said card inlet into an internal part of said casing;

a drive roller supported on one side of said card guideway adjacent to said card inlet by a pivot axis inclined towards said guideway by a small angle relative to a vertical line perpendicular to a major surface of a card guided by said guideway, a peripheral part of said drive roller being provided with frictional engagement means and an effective diameter of said drive roller and said small angle being selected in relation with a spacing of said pivot axis relative to said card guideway so that said frictional engagement means may about said major surface of said card;

drive means for producing mechanical power; and power transmission means for transmitting said mechanical power to said drive roller as rotary power for rotating the same.

18. A card conveying structure according to claim 17, further comprising counter pressure means for supporting another major surface of said card against a part of said drive roller abutting said card.

19. A card conveying structure according to claim 18, wherein said counter pressure means comprises a sheet spring fixedly secured to a lower wall of said casing at its base end and having bifurcated free ends extending along said guideway, and a guide roller pivotally supported between said bifurcated free ends of said sheet spring so as to be rotatable around a pivot axis perpendicular to said guideway and in parallel with said major surface.

* * * * *